United States Patent
Hashimoto et al.

(10) Patent No.: US 10,576,498 B2
(45) Date of Patent: Mar. 3, 2020

(54) METHOD FOR PRODUCING MULTILAYER COATED FILM

(71) Applicant: RIKEN TECHNOS CORPORATION, Tokyo (JP)

(72) Inventors: Taketo Hashimoto, Tokyo (JP); Nozomu Washio, Tokyo (JP)

(73) Assignee: RIKEN TECHNOS CORPORATION (JP)

( * ) Notice: Subject to any disclaimer, the term of this patent is extended or adjusted under 35 U.S.C. 154(b) by 0 days.

(21) Appl. No.: 15/128,014

(22) PCT Filed: Jan. 27, 2015

(86) PCT No.: PCT/JP2015/052129
§ 371 (c)(1),
(2) Date: Sep. 21, 2016

(87) PCT Pub. No.: WO2015/141281
PCT Pub. Date: Sep. 24, 2015

(65) Prior Publication Data
US 2017/0120296 A1 May 4, 2017

(30) Foreign Application Priority Data

Mar. 21, 2014 (JP) ................................ 2014-059314
Dec. 23, 2014 (JP) ................................ 2014-259572

(51) Int. Cl.
*B05D 7/00* (2006.01)
*B05D 3/06* (2006.01)
(Continued)

(52) U.S. Cl.
CPC .............. *B05D 7/544* (2013.01); *B05D 1/26* (2013.01); *B05D 1/265* (2013.01); *B05D 3/067* (2013.01);
(Continued)

(58) Field of Classification Search
CPC ........ B05D 7/544; B05D 1/265; B05D 3/067; B05D 7/546; B05D 1/26; B05D 2252/02;
(Continued)

(56) References Cited

U.S. PATENT DOCUMENTS 3,809,633 A * 5/1974 Magnotta et al. ... C08G 18/835 522/98
2004/0042379 A1 * 3/2004 Schoeppel ............... G11B 7/24 369/275.1
(Continued)

FOREIGN PATENT DOCUMENTS

| CN | 101010603 A | 8/2007 |
|---|---|---|
| JP | S60208337 A | 10/1985 |

(Continued)

OTHER PUBLICATIONS

English machine translation of JP 2006-099081 (Year: 2006).*
(Continued)

*Primary Examiner* — Robert S Walters, Jr.
(74) *Attorney, Agent, or Firm* — Bracewell LLP; Brad Y. Chin

(57) ABSTRACT

Embodiments of the invention provide a method for producing a multilayer coated film which involves obtaining a first layered body by forming, on a film substrate, a wet-coated film including a coating material (A) containing an active energy ray-curable resin which contains a first photopolymerization initiator and a second photopolymerization initiator, the reaction wavelengths of which differ from one another; and forming a pre-cured coated film including the coating material (A) in a dry-to-the-touch state by preliminarily curing the wet-coated film including the coating material (A), by irradiating the first layered body with active energy rays which include the reaction wavelength of the first photopolymerization initiator and do not include the reaction wavelength of the second photopolymerization ini-
(Continued)

tiator. The method further includes obtaining a second layered body by forming a wet-coated film including a coating material (B) on the pre-cured coated film including the coating material (A); and obtaining the multilayer coated film by fully curing the pre-cured coated film including the coating material (A) by irradiating the second layered body with active energy rays including the reaction wavelength of the second photopolymerization initiator.

6 Claims, 1 Drawing Sheet

(51) Int. Cl.
   B05D 1/26 (2006.01)
   C08J 7/12 (2006.01)
   C08J 3/24 (2006.01)
   C08J 7/04 (2020.01)
(52) U.S. Cl.
   CPC ............ B05D 7/546 (2013.01); C08J 3/243 (2013.01); C08J 3/244 (2013.01); C08J 7/042 (2013.01); C08J 7/123 (2013.01); B05D 2252/02 (2013.01); C08J 2333/24 (2013.01); C08J 2367/02 (2013.01)
(58) Field of Classification Search
   CPC ... C08J 7/123; C08J 3/243; C08J 7/042; C08J 3/244; C08J 2367/02; C08J 2333/24
   See application file for complete search history.

(56) References Cited

U.S. PATENT DOCUMENTS

| | | | |
|---|---|---|---|
| 2010/0033652 A1* | 2/2010 | Yamashita | G02B 1/111 349/64 |
| 2011/0015317 A1 | 1/2011 | Khrenov et al. | |
| 2016/0229159 A1* | 8/2016 | Nakashima | B32B 27/08 |

FOREIGN PATENT DOCUMENTS

| JP | H0419142 A | 1/1992 |
|---|---|---|
| JP | H05193055 A | 8/1993 |
| JP | H06166714 A | 6/1994 |
| JP | H06256537 A | 9/1994 |
| JP | H09159804 A | 6/1997 |
| JP | H09290427 A | 11/1997 |
| JP | H1177877 A | 3/1999 |
| JP | H11255923 A | 9/1999 |
| JP | 2000-280268 A | 10/2000 |
| JP | 2002-194249 A | 7/2002 |
| JP | 2002-338702 A | 11/2002 |
| JP | 2003-019759 A | 1/2003 |
| JP | 2006-099081 A | 4/2006 |
| JP | 2006-182879 A | 7/2006 |
| JP | 2006-309033 A | 11/2006 |
| JP | 2006-328331 A | 12/2006 |
| JP | 2006-328334 A | 12/2006 |
| JP | 2007-137022 A | 6/2007 |
| JP | 2008-181091 A | 8/2008 |
| JP | 2008-255175 A | 10/2008 |
| JP | 2008-277022 A | 11/2008 |
| JP | 2009-107180 A | 5/2009 |
| JP | 2009-137206 A | 6/2009 |
| JP | 2009-139660 A | 6/2009 |
| JP | 2009-279806 A | 12/2009 |
| JP | 2009-292871 A | 12/2009 |
| JP | 2010-64332 A | 3/2010 |
| JP | 2010-085978 A | 4/2010 |
| JP | 2010-105188 A | 5/2010 |
| JP | 2010-162899 A | 7/2010 |
| JP | 2010-221565 A | 10/2010 |
| JP | 2010-254742 A | 11/2010 |
| JP | 2010-284840 A | 12/2010 |
| JP | 2011-519999 A | 7/2011 |
| JP | 2012-206313 A | 10/2012 |
| JP | 2013-086273 A | 5/2013 |
| JP | 2013-176985 A | 9/2013 |
| JP | 2013-208896 A | 10/2013 |
| TW | 200624850 A | 7/2006 |
| WO | 2013128697 A1 | 9/2013 |

OTHER PUBLICATIONS

PCT/JP2015/052129 International Search Report dated Apr. 28, 2015; 2 pgs.
TW104107528 Office Action dated Jul. 25, 2018; 10 pages.
JP2014259572 Office Action dated Nov. 30, 2018; 9 pgs.
CN201580015273.6 Office Action dated Feb. 3, 2019; 12 pgs.
CN201580015273.6 Second Office Action dated Jul. 8, 2019; 16 pgs.

* cited by examiner

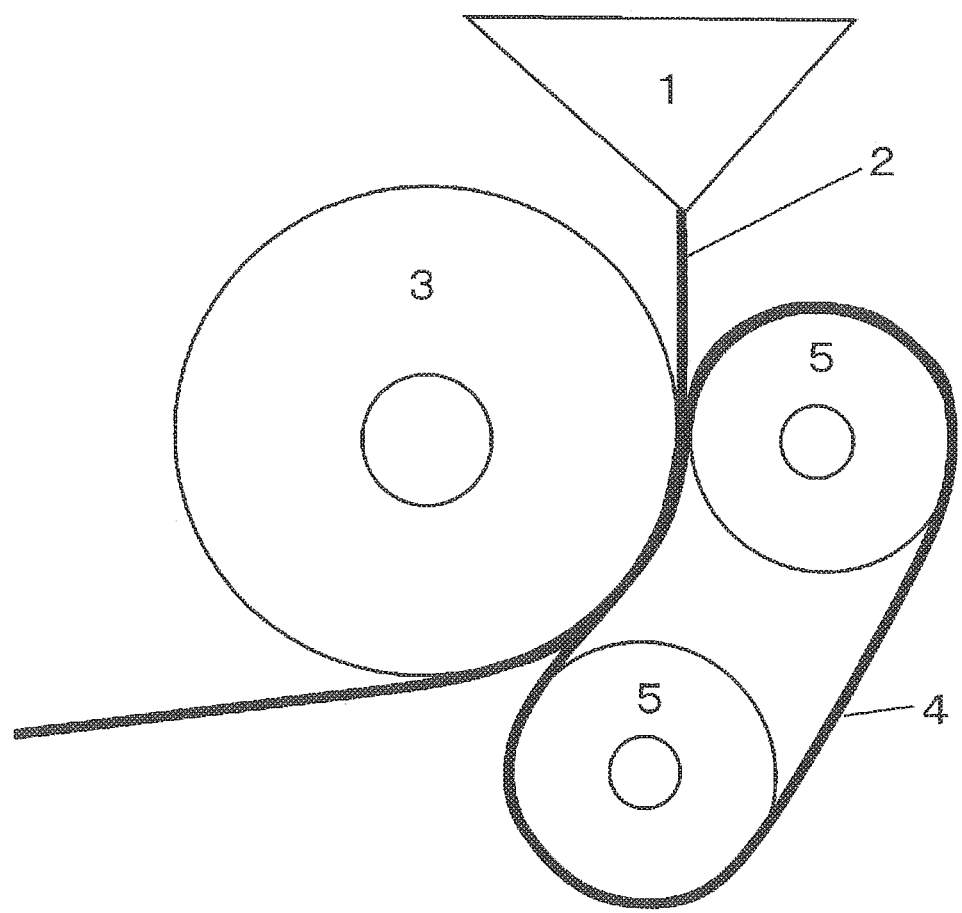

METHOD FOR PRODUCING MULTILAYER COATED FILM

CROSS REFERENCE TO RELATED APPLICATIONS

This application claims the benefit of and priority to PCT/JP2015/052129, filed on Jan. 27, 2015, entitled (translation), "METHOD FOR PRODUCING MULTILAYER COATED FILM," which claims the benefit of and priority to Japanese Patent Application Nos. 2014-059314, filed on Mar. 21, 2014, and 2014-259572, filed on Dec. 23, 2014, all of which are hereby incorporated by reference in their entirety into this application.

BACKGROUND

Field of the Invention

Embodiments of the invention relate to a method for producing a multilayer coated film. More particularly, embodiments of the invention relate to a method for producing a multilayer coated film having a coating including a paint including an active energy ray-curable resin, particularly a thin coating including a paint including an active energy ray-curable resin.

Description of the Related Art

Active energy ray-curable resins are rapidly polymerized and cured by radicals generated by irradiation with active energy rays, and coatings having excellent abrasion resistance, chemical resistance, wear resistance, heat resistance, water resistance, and the like are obtained. Therefore, the active energy ray-curable resins are conventionally widely used in various fields such as optical functional films and decorative films. There has been such a disadvantage, however, that the curing of the active energy ray-curable resin is radical polymerization, and therefore the active energy ray-curable resin is susceptible to polymerization inhibition by oxygen in the air, and particularly with a thin coating, the curing is insufficient. Another disadvantage is that when the active energy ray irradiation time is increased for sufficient curing, the speed of the producing line decreases, and the coating yellows.

Therefore, as a technique for preventing polymerization inhibition by oxygen, a method of forming a laminate so as to sandwich a coating of an active energy ray-curable resin between a substrate and a protective film, performing irradiation with active energy rays to cure the coating, and separating the protective film has been proposed in the conventional art. But, this method is not advantageous in terms of cost because the protective film is removed from a final product for disposal; and the surface shape of the protective film is transferred to the surface shape of the coating, and therefore high smoothness is required.

SUMMARY

Embodiments of the invention provide a method for producing a multilayer coated film including a coating, particularly a thin coating, of an active energy ray-curable resin without using a material that is removed from a final product for disposal, such as a protective film, with the yellowing of the coating suppressed, and without decreasing the speed of a producing line, while completely curing the coating.

Embodiments of the invention are achieved by forming on, a coat in a set-to-touch state including a paint including an active energy ray-curable resin, a coating including another paint, and then performing irradiation with active energy rays for complete curing.

Specifically, embodiments of the invention provide a method for producing a multilayer coated film, including the steps of:

(1) forming a wet coat including a paint A including an active energy ray-curable resin including a first photopolymerization initiator and a second photopolymerization initiator having different reaction wavelengths from each other on a film substrate to obtain a first laminate;

(2) irradiating the first laminate with active energy rays having the reaction wavelength of the first photopolymerization initiator and not having the reaction wavelength of the second photopolymerization initiator to preliminarily cure the wet coat including the paint A to form a preliminarily cured coat including the paint A in a set-to-touch state;

(3) forming a wet coat including a paint B on the preliminarily cured coat including the paint A to obtain a second laminate; and (4) irradiating the second laminate with active energy rays having the reaction wavelength of the second photopolymerization initiator to completely cure the preliminarily cured coat including the paint A.

The "preliminarily" cured coat and the "completely" cured coat referred to herein are intended to mean the states achieved by "first-stage" curing and "second-stage" curing in two-stage curing using active energy rays in steps (2) and (4), respectively.

According to another embodiment of the invention there is provided a method for producing a multilayer coated film, including the steps of:

(5) forming a wet coat including a paint C including an active energy ray-curable resin including a photopolymerization initiator on a film substrate to obtain a first laminate;

(6) preliminarily drying the wet coat including the paint C to form a preliminarily dried coat including the paint C in a set-to-touch state;

(7) forming a wet coat including a paint B on the preliminarily dried coat including the paint C to obtain a second laminate; and (8) irradiating the second laminate with active energy rays having a reaction wavelength of the photopolymerization initiator to cure the preliminarily dried coat including the paint C.

The "preliminary" drying referred to herein is intended to mean drying prior to a curing reaction with active energy rays.

According to at least one embodiment, the reaction wavelength of the first photopolymerization initiator and the reaction wavelength of the second photopolymerization initiator are preferably 20 nm or more apart.

According to at least one embodiment, the film substrate may be a poly(meth)acrylimide resin film.

According to at least one embodiment, a multilayer coated film is formed by the method.

According to at least one embodiment, there is provided an article including a multilayer coated film produced by the method.

BRIEF DESCRIPTION OF DRAWING

FIG. 1 is a conceptual diagram showing a film forming apparatus used in Examples according to various embodiments of the invention.

DETAILED DESCRIPTION

According to at least one embodiment, there is provided a method for producing a multilayer coated film including the step of (1) forming a wet coat including a paint A including an active energy ray-curable resin including a first photopolymerization initiator and a second photopolymerization initiator having different reaction wavelengths from each other on a film substrate to obtain a first laminate.

According to at least one embodiment, the above paint A includes an active energy ray-curable resin and at least two or more photopolymerization initiators, a first photopolymerization initiator and a second photopolymerization initiator having different reaction wavelengths from each other. By containing two or more photopolymerization initiators having different reaction wavelengths from each other in the paint A in this manner, even if the first photopolymerization initiator is reacted for preliminary curing in order to bring the wet coat including the paint A into a set-to-touch state in step (2), the second photopolymerization initiator remains without reacting, and the coating can be completely cured in step (4). In addition, in order to prevent the second photopolymerization initiator that should act in step (4) from reacting in step (2), the reaction wavelength of the first photopolymerization initiator and the reaction wavelength of the second photopolymerization initiator are preferably 20 nm or more apart, more preferably 40 nm or more apart. Either of the reaction wavelength of the first photopolymerization initiator and the reaction wavelength of the second photopolymerization initiator may be a short wavelength (or a long wavelength).

As used herein, the reaction wavelength of a photopolymerization initiator means the wavelength at the peak top position of the maximum absorbance peak in the wavelength-absorbance curve of the photopolymerization initiator. The reaction wavelength of a photopolymerization initiator is obtained from an absorbance curve at wavelengths of 200 to 500 nm obtained by injecting a measurement liquid of 0.01% by mass of the photopolymerization initiator dissolved in acetonitrile (for example, acetonitrile for absorption spectrometry from Wako Pure Chemical Industries, Ltd. was used) into a quartz optical cell having an optical path length of 10 mm, and performing measurement using a spectrophotometer, for example, "SolidSpec-3700" (trade name) available from SHIMADZU CORPORATION.

According to at least one embodiment, the above first photopolymerization initiator and the above second photopolymerization initiator are not limited except that two or more photopolymerization initiators having different reaction wavelengths from each other are used, and any photopolymerization initiators can be used. Examples of the photopolymerization initiators to be used include benzophenone compounds such as benzophenone, methyl-o-benzoylbenzoate, 4-methylbenzophenone, 4,4'-bis(diethylamino) benzophenone, methyl o-benzoylbenzoate, 4-phenylbenzophenone, 4-benzoyl-4'-methyldiphenyl sulfide, 3,3',4,4'-tetra(tert-butylperoxycarbonyl)benzophenone, and 2,4,6-trimethylbenzophenone; benzoin compounds such as benzoin, benzoin methyl ether, benzoin ethyl ether, benzoin isopropyl ether, and benzyl methyl ketal; acetophenone compounds such as acetophenone, 2,2-dimethoxy-2-phenylacetophenone, and 1-hydroxycyclohexyl phenyl ketone; anthraquinone compounds such as methylanthraquinone, 2-ethylanthraquinone, and 2-amylanthraquinone; thioxanthone compounds such as thioxanthone, 2,4-diethylthioxanthone, and 2,4-diisopropylthioxanthone; alkylphenone compounds such as acetophenone dimethyl ketal; triazine compounds; biimidazole compounds; acylphosphine oxide compounds; titanocene compounds; oxime ester compounds; oxime phenylacetate compounds; hydroxy ketone compounds; and aminobenzoate compounds.

Examples of the above active energy ray-curable resin include one or more selected from (meth)acryloyl group-containing prepolymers or oligomers such as polyurethane (meth)acrylate, polyester (meth)acrylate, polyacryl (meth) acrylate, epoxy (meth)acrylate, polyalkylene glycol poly (meth)acrylate, and polyether (meth)acrylate; (meth)acryloyl group-containing monofunctional reactive monomers such as methyl (meth)acrylate, ethyl (meth)acrylate, n-butyl (meth)acrylate, hexyl (meth)acrylate, 2-ethylhexyl (meth) acrylate, lauryl (meth)acrylate, isobornyl (meth)acrylate, dicyclopentenyl (meth)acrylate, dicyclopentenyloxyethyl (meth)acrylate, phenyl (meth)acrylate, phenyl cellosolve (meth)acrylate, 2-methoxyethyl (meth)acrylate, hydroxyethyl (meth)acrylate, hydroxypropyl (meth)acrylate, 2-acryloyloxyethyl hydrogen phthalate, dimethylaminoethyl (meth)acrylate, trifluoroethyl (meth)acrylate, and trimethylsiloxyethyl methacrylate; monofunctional reactive monomers such as N-vinylpyrrolidone and styrene; (meth)acryloyl group-containing bifunctional reactive monomers such as diethylene glycol di(meth)acrylate, neopentyl glycol di(meth)acrylate, 1,6-hexanediol di(meth)acrylate, polyethylene glycol di(meth)acrylate, 2,2'-bis(4-(meth)acryloyloxypolyethyleneoxyphenyl)propane, and 2,2'-bis(4-(meth)acryloyloxypolypropyleneoxyphenyl)propane; (meth)acryloyl group-containing trifunctional reactive monomers such as trimethylolpropane tri(meth)acrylate and trimethylolethane tri(meth)acrylate; (meth)acryloyl group-containing tetrafunctional reactive monomers such as pentaerythritol tetra (meth)acrylate; and (meth)acryloyl group-containing hexafunctional reactive monomers such as dipentaerythritol hexaacrylate, or resins including one or more of the above as a constituent monomer. As the above active energy ray-curable resin, one or more of these can be used.

As used herein, a (meth)acrylate means an acrylate or a methacrylate.

A compound having two or more isocyanate groups (—N=C=O) in one molecule can be contained in the above paint A in order to aid a curing reaction. Examples of the above compound having two or more isocyanate groups in one molecule include urethane crosslinking agents such as methylenebis-4-cyclohexyl isocyanate; polyisocyanates such as a trimethylolpropane adduct of tolylene diisocyanate, a trimethylolpropane adduct of hexamethylene diisocyanate, a trimethylolpropane adduct of isophorone diisocyanate, an isocyanurate of tolylene diisocyanate, an isocyanurate of hexamethylene diisocyanate, an isocyanurate of isophorone diisocyanate, and a biuret of hexamethylene diisocyanate; and blocked isocyanates of the above polyisocyanates. These can each be used alone, or two or more of these can be used in combination. In addition, a catalyst such as dibutyltin dilaurate or dibutyltin diethylhexoate may be added as needed.

According to at least one embodiment, the above paint A may include one or two or more additives such as an antistatic agent, a surfactant, a leveling agent, a thixotropic agent, an antifouling agent, a printability-improving agent, an antioxidant, a weather resistance stabilizer, a light resistance stabilizer, an ultraviolet absorbing agent, a heat stabilizer, a colorant, inorganic fine particles, and organic fine particles as needed.

According to at least one embodiment, the above paint A may include a solvent as needed, in order to be diluted to a concentration at which coating can be made easy. The solvent is not particularly limited as long as it does not react with the essential components and other optional components of the paint A or catalyze (promote) the self-reactions (including deterioration reactions) of these components.

Examples of the solvent include 1-methoxy-2-propanol, ethyl acetate, n-butyl acetate, toluene, methyl ethyl ketone, methyl isobutyl ketone, diacetone alcohol, and acetone.

According to at least one embodiment, the above paint A is obtained by mixing and stirring these components.

According to at least one embodiment, the method for forming a wet coat including a paint A on a film substrate in the above step (1) is not particularly limited, and any of known web coating methods may be used. Specific examples thereof include methods, such as roll coating, gravure coating, reverse coating, roll brushing, spray coating, air knife coating, and die coating.

According to at least one embodiment, the above film substrate is not particularly limited, and any film can be used. Among them, transparent resin films having excellent transparency, smoothness, heat resistance, mechanical strength, rigidity, and surface hardness can be suitably used. Examples of the preferred transparent resin films excellent in these properties include films of cellulose ester resins such as triacetyl cellulose, polyester resins such as polyethylene terephthalate, cyclic hydrocarbon resins such as ethylene norbornene copolymers, acrylic resins, poly(meth)acrylimide resins, aromatic polycarbonate resins, polyamide resins, polyarylate resins, polymeric urethane acrylate resins, and polyimide resins. The above film substrate encompasses unstretched films, uniaxially stretched films, and biaxially stretched films. In addition, as understood by those skilled in the art, as the above film substrate, one of the group of films illustrated here may be used as a single layer, or alternatively, a plurality of films selected from the group of these films may be combined and used as a multilayer film.

According to at least one embodiment, the thickness of the above film substrate is not particularly limited and can be any thickness as desired. When the multilayer coated film obtained by the producing method of the various embodiments of the invention is used in an application where high rigidity is not required, the thickness of the above film substrate may usually be 20 μm or more, preferably 50 μm or more, from the viewpoint of handling properties. In addition, the thickness of the above film substrate may usually be 250 μm or less, preferably 150 μm or less from the viewpoint of economy. When the multilayer coated film obtained by the producing method of the present invention is applied to One Plastic Solution, the thickness of the above film substrate may usually be 100 μm or more, preferably 200 μm or more, and more preferably 300 μm or more from the viewpoint of maintaining rigidity required as a display faceplate. In addition, the thickness of the above film substrate may usually be 1500 μm or less, preferably 1200 μm or less, and more preferably 1000 μm or less from the viewpoint of meeting the requirement of the thinning of an image display (including an image display having a touch panel function and an image display not having a touch panel function).

In recent years, for the purpose of the weight reduction of an image display, a touch panel having a two-layer structure in which a touch sensor is directly formed on the back side of a display faceplate (the so-called One Glass Solution) has been proposed. In addition, for further weight reduction, One Plastic Solution replacing the so-called One Glass Solution has also been proposed. When the multilayer coated film obtained by the producing method of the present invention is used in One Plastic Solution replacing the so-called One Glass Solution, a poly(meth)acrylimide resin film is preferred as the above film substrate.

According to at least one embodiment, the above poly(meth)acrylimide resin is a thermoplastic resin in which the characteristics of the high transparency, high surface hardness, and high rigidity of an acrylic resin remain as they are, and the characteristics of the excellent heat resistance and dimensional stability of a polyimide resin are introduced, and the drawback of being colored pale yellow to reddish brown is improved. For example, such a poly(meth)acrylimide resin is disclosed in JP 2011-519999 A. As used herein, poly(meth)acrylimide means polyacrylimide or polymethacrylimide.

According to at least one embodiment, the above poly(meth)acrylimide resin is not limited as long as it has high transparency and is uncolored for the purpose of use in an image display such as a touch panel, and any poly(meth)acrylimide resin can be used.

Preferred examples of the above poly(meth)acrylimide resin include those having a yellowness index (measured according to JIS K7105: 1981 using a colorimeter "Solid-Spec-3700" (trade name) from SHIMADZU CORPORATION) of 3 or less. The yellowness index is more preferably 2 or less, further preferably 1 or less. In addition, from the viewpoint of an extrusion load and the stability of the molten film, preferred examples of the poly(meth)acrylimide resin include those having a melt mass flow rate (measured according to ISO1133 under the conditions of 260° C. and 98.07 N) of 0.1 to 20 g/10 min. The melt mass flow rate is more preferably 0.5 to 10 g/10 min. Further, from the viewpoint of heat resistance, preferred examples of the poly(meth)acrylimide resin include those having a glass transition temperature of 150° C. or more. The glass transition temperature is more preferably 170° C. or more.

In addition, additives such as a thermoplastic resin other than the poly(meth)acrylimide resin; a pigment, an inorganic filler, an organic filler, and a resin filler; and a lubricant, an antioxidant, a weather resistance stabilizer, a heat stabilizer, a release agent, an antistatic agent, and a surfactant, and the like can be further blended in the above poly(meth)acrylimide resin as desired, within the limits not contrary to the object of the present invention. The amounts of these optional components blended are usually about 0.01 to 10 parts by mass when the poly(meth)acrylimide resin is 100 parts by mass.

Commercial examples of the above poly(meth)acrylimide resin include "PLEXIMID TT70" (trade name) from Evonik Industries AG.

The above poly(meth)acrylimide resin film is not limited to a single-layer film of the poly(meth)acrylimide resin. For example, the above poly(meth)acrylimide resin film may be a multilayer film of the poly(meth)acrylimide resin and any other resin like a transparent multilayer film in which a first poly(meth)acrylimide resin layer ($\alpha 1$); an aromatic polycarbonate resin layer ($\beta$); and a second poly(meth)acrylimide resin layer ($\alpha 2$) are directly laminated in this order.

According to at least one embodiment, the poly(meth)acrylimide resin has excellent heat resistance and surface hardness but is likely to have insufficient cutting processability. On the other hand, the aromatic polycarbonate resin has excellent cutting processability but is likely to have insufficient heat resistance and surface hardness. Therefore, by using the transparent multilayer film having the above layer configuration, a film in which the weaknesses of both are compensated for each other and which is excellent in all of heat resistance, surface hardness, and cutting processability can be easily obtained.

According to at least one embodiment, the layer thickness of the above $\alpha 1$ layer is not particularly limited and may usually be 20 μm or more, preferably 40 μm or more, and more preferably 60 μm or more from the viewpoint of the heat resistance and surface hardness of the multilayer coated film obtained by the producing method of the present invention.

According to at least one embodiment, the layer thickness of the above α2 layer is not particularly limited but is preferably the same layer thickness as the above α1 layer from the viewpoint of the curling resistance of the multilayer coated film obtained by the producing method of the present invention.

Here, "the same layer thickness" should not be construed as the same layer thickness in a physicochemically strict sense. It should be construed as the same layer thickness within the range of fluctuations of usually industrially performed process and quality control because when the above α1 layer and the above α2 layer have the same layer thickness within the range of fluctuations of usually industrially performed process and quality control, the curling resistance of the multilayer film can be kept well. In the case of an unstretched multilayer film formed by T-die coextrusion, it is usually subjected to process and quality control in the range of about −5 to +5 μm, and therefore a layer thickness of 65 μm and a layer thickness of 75 μm should be construed as the same. "The same layer thickness" here can also be reworded as "substantially the same layer thickness."

According to at least one embodiment, the layer thickness of the above β layer is not particularly limited and may usually be 20 μm or more, preferably 80 μm or more, and more preferably 120 μm or more from the viewpoint of the cutting resistance of the multilayer coated film obtained by the producing method of the present invention.

For the above α1 layer and α2 layer, the above-described poly(meth)acrylimide resin can be used.

For the poly(meth)acrylimide resin of the above α1 layer and the poly(meth)acrylimide resin of the above α2 layer, those having different resin properties, for example, poly(meth)acrylimide resins having different melt mass flow rates or glass transition temperatures, may be used. Those having the same resin properties are preferably used, however, from the viewpoint of the curling resistance of the multilayer coated film obtained by the producing method of the present invention. For example, using the same lot of the same grade is one of the preferred embodiments.

As the aromatic polycarbonate resin of the above β layer, for example, one or a mixture of two or more types of a polymer obtained by the interfacial polymerization of an aromatic dihydroxy compound such as bisphenol A, dimethylbisphenol A, or 1,1-bis(4-hydroxyphenyl)-3,3,5-trimethylcyclohexane and phosgene; and a polymer obtained by the transesterification reaction of an aromatic dihydroxy compound such as bisphenol A, dimethylbisphenol A, or 1,1-bis(4-hydroxyphenyl)-3,3,5-trimethylcyclohexane and a carbonic acid diester such as diphenyl carbonate can be used.

Examples of a preferred optional component that can be contained in the above aromatic polycarbonate resin include a core-shell rubber. By using the core-shell rubber in an amount of 0 to 30 parts by mass (100 to 70 parts by mass of the aromatic polycarbonate resin), preferably 0 to 10 parts by mass (100 to 90 parts by mass of the aromatic polycarbonate resin), when the sum of the aromatic polycarbonate resin and the core-shell rubber is 100 parts by mass, the cutting processability and the impact resistance can be more enhanced.

Examples of the above core-shell rubber include methacrylate-styrene/butadiene rubber graft copolymers, acrylonitrile-styrene/butadiene rubber graft copolymers, acrylonitrile-styrene/ethylene-propylene rubber graft copolymers, acrylonitrile-styrene/acrylate graft copolymers, methacrylate/acrylate rubber graft copolymers, and methacrylate-acrylonitrile/acrylate rubber graft copolymers. One or a mixture of two or more of these can be used.

In addition, additives such as a thermoplastic resin other than the aromatic polycarbonate resin and the core-shell rubber; a pigment, an inorganic filler, an organic filler, and a resin filler; and a lubricant, an antioxidant, a weather resistance stabilizer, a heat stabilizer, a release agent, an antistatic agent, and a surfactant, and the like can be further blended in the above aromatic polycarbonate resin as desired, within the limits not contrary to the object of the present invention. The amount of these optional component(s) blended is usually about 0.01 to 10 parts by mass when the sum of the aromatic polycarbonate resin and the core-shell rubber is 100 parts by mass.

According to at least one embodiment, the film forming method for obtaining the above single-layer film of the poly(meth)acrylimide resin is not particularly limited. Preferred examples thereof include a method including the steps of (A) continuously extruding a molten film of the poly(meth)acrylimide resin from a T die using an apparatus including an extruder and the T die; and (B) supplying and charging the above molten film of the poly(meth)acrylimide resin between a first rotating or circulating mirror-finished body and a second rotating or circulating mirror-finished body and pressing the molten film.

Similarly, the film forming method when the above poly(meth)acrylimide resin film is the above transparent multilayer film is not particularly limited. Preferred examples thereof include a method including the steps of (A') continuously coextruding a molten film of a transparent multilayer film in which a first poly(meth)acrylimide resin layer (α1); an aromatic polycarbonate resin layer (β); and a second poly(meth)acrylimide resin layer (α2) are directly laminated in this order from a T die using a coextrusion apparatus including an extruder and the T die; and (B') supplying and charging the above molten film of the transparent multilayer film between a first rotating or circulating mirror-finished body and a second rotating or circulating mirror-finished body and pressing the molten film.

In the above step (A) or the above step (A'), as the above T die, any one can be used. Examples thereof include a manifold die, a fishtail die, and a coat hanger die.

As the above coextrusion apparatus, any one can be used. Examples thereof include feed-block type, multi-manifold type, and stack-plate type coextrusion apparatuses.

In the above step (A) or the above step (A'), as the above extruder, any one can be used. Examples thereof include a single-screw extruder, a corotating twin-screw extruder, and a counter-rotating twin-screw extruder.

In addition, in order to suppress the deterioration of the poly(meth)acrylimide resin and the aromatic polycarbonate resin, it is also preferred that the interior of the extruder is subjected to a purge operation with nitrogen.

Further, the poly(meth)acrylimide resin is a resin having high moisture absorbency and therefore is preferably dried before being subjected to film formation. In addition, it is also preferred that the poly(meth)acrylimide resin dried in a dryer is directly transported from the dryer to the extruder and charged. The set temperature of the dryer is preferably 100 to 150° C. In addition, it is also preferred that the measuring zone usually at the screw tip of the extruder is equipped with a vacuum vent.

According to at least one embodiment, the temperature of the above T die used in the above step (A) or the above step (A') is preferably set at least 260° C. or more in order to stably perform the step of continuously extruding or coextruding the molten film of the poly(meth)acrylimide resin or the above molten film of the transparent multilayer film. More preferably, the temperature of the above T die is 270° C. or more. In addition, in order to suppress the deterioration of the poly(meth)acrylimide resin and the aromatic polycarbonate resin, the temperature of the T die is preferably set at 350° C. or less.

In addition, the ratio (R/T) of the lip opening (R) to the thickness of the obtained film (T) is preferably 10 or less, more preferably 5 or less, from the viewpoint of preventing retardation from increasing. In addition, the ratio (R/T) is preferably 1 or more, more preferably 1.5 or more, from the viewpoint of preventing the extrusion load from becoming excessive.

Examples of the above first mirror-finished body used in the above step (B) or the above step (B') include a mirror-finished roll and a mirror-finished belt. In addition, examples of the above second mirror-finished body include a mirror-finished roll and a mirror-finished belt.

According to at least one embodiment, the above mirror-finished roll is a roll whose surface is mirror-finished. The above mirror-finished roll includes those made of metals, ceramics, and silicone rubbers. In addition, the surface of the mirror-finished roll can be subjected to a chrome plating treatment, an iron-phosphorus alloy plating treatment, a hard carbon treatment by PVD or CVD, or the like for the purpose of protection from corrosion and scratching.

According to at least one embodiment, the above mirror-finished belt is a seamless belt usually made of a metal whose surface is mirror-finished. The mirror-finished belt is arranged, for example, to loop around a pair of belt rollers and circulate between them. In addition, the surface of the mirror-finished belt can be subjected to a chrome plating treatment, an iron-phosphorus alloy plating treatment, a hard carbon treatment by PVD or CVD, or the like for the purpose of protection from corrosion and scratching.

According to at least one embodiment, the above mirror finishing is not limited and can be performed by any method. Examples thereof include a method of performing polishing using fine abrasive grains to set the arithmetic average roughness (Ra) of the surface of the above mirror-finished body at preferably 100 nm or less, more preferably 50 nm or less, and set the ten-point average roughness (Rz) at preferably 500 nm or less, more preferably 250 nm or less.

Though there is no intention of being bound by any theory, it can be considered that a poly(meth)acrylimide resin film or a transparent multilayer film having excellent transparency, surface smoothness, and appearance is obtained by the above film forming method because the molten film of the poly(meth)acrylimide resin film or the transparent multilayer film is pressed by the first mirror-finished body and the second mirror-finished body, and thus the highly smooth surface states of the first mirror-finished body and the second mirror-finished body are transferred to the film to correct faulty portions such as die streaks.

In order that the above transfer of the surface states is performed well, the surface temperature of the first mirror-finished body is preferably 100° C. or more, more preferably 120° C. or more, and further preferably 130° C. or more. On the other hand, in order to prevent the development on the film of appearance faults (exfoliation marks) accompanying the peeling-off from the first mirror-finished body, the surface temperature of the first mirror-finished body is made to be preferably 200° C. or lower, and more preferably 160° C. or lower.

In order that the above transfer of the surface states is performed well, the surface temperature of the second mirror-finished body is preferably 20° C. or more, more preferably 60° C. or more, and further preferably 100° C. or more. On the other hand, in order to prevent the development on the film of appearance faults (exfoliation marks) accompanying the peeling-off from the second mirror-finished body, the surface temperature of the second mirror-finished body is made to be preferably 200° C. or lower, and more preferably 160° C. or lower.

According to at least one embodiment, the surface temperature of the first mirror-finished body is preferably higher than the surface temperature of the second mirror-finished body. This is because the film is held by the first mirror-finished body and fed to the next transport roll.

The total light transmittance (measured according to JIS K7361-1: 1997 using, for example, a turbidimeter "NDH2000" (trade name) from Nippon Denshoku Industries Co., Ltd.) of the above poly(meth)acrylimide resin film is preferably 85% or more, more preferably 90% or more, and further preferably 92% or more. A higher total light transmittance is preferred. A poly(meth)acrylimide resin film having a total light transmittance in the above preferred range can be preferably used as an image display member.

According to at least one embodiment, the haze (measured according to JIS K7136: 2000 using a turbidimeter "NDH2000" (trade name) from Nippon Denshoku Industries Co., Ltd.) of the above poly(meth)acrylimide resin film is preferably 3.0% or less, more preferably 2.0% or less, and further preferably 1.5% or less. A lower haze is preferred. A poly(meth)acrylimide resin film having a haze in the above preferred range can be preferably used as an image display member.

According to at least one embodiment, the yellowness index (measured according to JIS K7105: 1981 using a colorimeter "SolidSpec-3700" (trade name) from SHIMADZU CORPORATION) of the above poly(meth) acrylimide resin film is preferably 3 or less, more preferably 2 or less, and further preferably 1 or less. A lower yellowness index is preferred. A poly(meth)acrylimide resin film having a yellowness index in the above preferred range can be preferably used as an image display member.

According to at least one embodiment, the above film substrate such as the above poly(meth)acrylimide resin film is preferably annealed at a temperature equal to or more than a temperature 20° C. lower than the glass transition temperature (hereinafter sometimes abbreviated as "Tg") of the raw material resin of the film such as the above poly(meth) acrylimide resin and equal to or less than a temperature 10° C. higher than Tg for 3 minutes or more before being subjected to the producing method of the present invention (before step (1) in the above first embodiment or before step (5) in the above second embodiment). The heat resistance and dimensional stability of the multilayer coated film obtained by the producing method of the present invention can be enhanced by such annealing.

According to at least one embodiment, the temperature of the above annealing is preferably Tg −20° C. or higher, more preferably Tg −12° C. or higher, and further preferably Tg −8° C. or higher from the viewpoint of the effect of improving heat resistance and dimensional stability. On the other hand, the temperature of the above annealing is preferably Tg +10° C. or lower, more preferably Tg +5° C. or lower, from the viewpoint of preventing web handling problems from occurring.

As used herein, the glass transition temperature of the resin is a midpoint glass transition temperature calculated from a curve in the last heating process measured in a program in which the resin is maintained at 250° C. for 3 minutes, cooled to 20° C. at 10° C./min, maintained at 20° C. for 3 minutes, and heated to 250° C. at 10° C./min, according to JIS K7121-1987, using, for example, a Diamond DSC differential scanning calorimeter from PerkinElmer Japan Co., Ltd.

According to at least one embodiment, the time of the above annealing is preferably 3 minutes or more, more preferably 5 minutes or more, from the viewpoint of the effect of improving heat resistance and dimensional stability. From the viewpoint of the effect of improving heat resistance and dimensional stability, there is no particular upper limit of the annealing time, but from the viewpoint of production efficiency, the annealing time may be preferably 30 minutes or less, more preferably 20 minutes or less, and further preferably 10 minutes or less.

According to at least one embodiment, the method of the above annealing is not particularly limited except for temperature and time and can be performed by any method. Examples of the method of the above annealing include a method of passing the film through a heating furnace set at a predetermined temperature at a line speed set so that a predetermined time is required for the film to pass from the inlet to the outlet.

In addition, the above film substrate may be one in which an anchor coat is provided on the surface on which the coat including the paint A is to be formed or both surfaces for the purpose of providing various functions, for example, protection from fouling on the film substrate; and enhancement of adhesive strength. The anchor coat is not particularly limited, and a commonly used coat such as a polyester coat, an acrylic coat, a polyurethane coat, an acrylic urethane coat, and a polyester urethane coat can be provided. The thickness of the anchor coat is usually about 0.001 to 20 µm.

According to at least one embodiment, the method for producing a multilayer coated film includes the step of (2) irradiating the first laminate with active energy rays having the reaction wavelength of the above first photopolymerization initiator and not having the reaction wavelength of the above second photopolymerization initiator to preliminarily cure the wet coat including the above paint A to form a preliminarily cured coat including the above paint A in a set-to-touch state.

According to at least one embodiment, the wet coat including the above paint A formed in the above step (1) is preliminary cured to reach a set-to-touch state or a nontacky state in the above step (2), and does not cause handling problems such as sticking to a web apparatus even if coming into direct contact with the web apparatus. Therefore, in the above next step (3), a wet coat including a paint B can be formed on the above preliminarily cured coat.

As used herein, the coat being in a "set-to-touch state (nontacky state)" means that the coat is in a state in which there are no handling problems even if the coat comes into direct contact with a web apparatus.

In the above step (2), active energy rays having the reaction wavelength of the first photopolymerization initiator and not having the reaction wavelength of the second photopolymerization initiator are used. Thus, in step (2), the second photopolymerization initiator that should act in the above step (4) can be prevented from reacting.

In addition, considering only that the second photopolymerization initiator that should act in the above step (4) is prevented from reacting, it is just required for the active energy rays not to have the reaction wavelength of the second photopolymerization initiator. However, active energy rays having a wavelength not contributing to the reaction of the first photopolymerization initiator only make the coat yellow, and therefore the active energy rays preferably have only a wavelength contributing to the reaction of the first photopolymerization initiator.

As used herein, "not having a reaction wavelength" means the following matter: given that the spectral transmittance of white active energy rays at the reaction wavelength is 100%, the spectral transmittance after the white active energy rays are made monochromatic by a filter or the like is 20% or less.

According to at least one embodiment, the method for obtaining such active energy rays is not limited and is arbitrary. Examples thereof include a method of generating white active energy rays from a high pressure mercury lamp, a metal halide lamp, or the like as a light source, and making the white active energy rays monochromatic by a filter such as a 365 filter (short wave cut filter), a 254 filter (long wave cut filter), and a 300 filter.

According to at least one embodiment, the dose of the active energy rays in the above step (2) can be appropriately optimized depending on the curing properties of the above paint A, coat thickness, line speed, and the like. The dose of the active energy rays in this step is usually 10 to 10000 mJ/cm$^2$. The dose of the active energy rays is preferably 20 to 1000 mJ/cm$^2$ for the purpose of bringing the coat into a set-to-touch state and from the viewpoint of suppressing the yellowing of the coat.

In addition, in advance of conducting the above step (2) after the above step (1), the wet coat including the above paint A may be preliminarily dried at a temperature of usually 23 to 150° C., preferably 50 to 120° C.

According to at least one embodiment, the method for producing a multilayer coated film includes the step of (3) forming a wet coat including a paint B on the preliminarily cured coat including the above paint A to obtain a second laminate.

Due to the wet coat including the above paint B formed in the above step (3), the coat including the above paint A does not come into direct contact with the air. Therefore, in the above next step (4), the coat including the above paint A can be easily completely cured without oxygen inhibition.

According to at least one embodiment, the above paint B used in the above step (3) is not particularly limited, but one with which a coat can be formed using a known web coating method and apparatus is preferred. In addition, as the above paint B, one that reaches a set-to-touch state when the coating including the above paint A is completely cured in the above next step (4) is preferred, and one that cures completely to reach a set-to-touch state is more preferred. When the curability is evaluated as being good when the following test (i) is performed for the obtained multilayer coated film, it is determined that the coat including the paint B also cures completely to reach a set-to-touch state.

Examples of the above paint B include paints including one or more of the followings: thermosetting resins such as unsaturated polyester resins, acrylic resins, methacrylic resins, hydrosilyl curing resins, allyl curing resins, bismaleimide resins, bisallylnadimide resins, phenolic resins, melamine resins, epoxy resins, and isocyanate resins; monomers having in the molecule at least two of one or more types of reactive groups such as an amino group, a vinyl group, an epoxy group, a methacryloxy group, an acryloxy group, an isocyanate group, a glycidyl group, an allyl group, an alkoxy group, an acyloxy group, an alkoxysilyl group, a hydrosilyl group, and a halogen group; oligomers or resins including one or more types of the monomers as a constituent monomer; and resins having in a side chain or at an end of the polymer chain at least two of one or more types of reactive groups such as an amino group, a vinyl group, an epoxy group, a methacryloxy group, an acryloxy group, an isocyanate group, a glycidyl group, an allyl group, an alkoxy group, an acyloxy group, an alkoxysilyl group, a hydrosilyl group, and a halogen group.

According to at least one embodiment, the method for producing a multilayer coated film includes the step of (4) irradiating the second laminate with active energy rays having the reaction wavelength of the above second photopolymerization initiator to completely cure the preliminarily cured coat including the above paint A.

According to at least one embodiment, the above step (4) is the step of completely curing the preliminarily cured coat including the above paint A, and active energy rays having the reaction wavelength of the above second photopolymerization initiator are used. From the viewpoint of completely curing the preliminarily cured coat including the above paint A, the active energy rays should have the reaction wavelength of the second photopolymerization initiator. Irradiation may be performed with white active energy rays from a high pressure mercury lamp, a metal halide lamp, or the like as a light source as they are. However, active energy rays having a wavelength not contributing to the reaction of the second photopolymerization initiator only make the coat yellow, and therefore irradiation is performed preferably with white active energy rays that are made monochromatic using a filter or the like so as to have only a wavelength contributing to the reaction of the second photopolymerization initiator.

According to at least one embodiment, the dose of the active energy rays in the above step (4) can be appropriately optimized by the curing properties of the above paint A, coat thickness, line speed, and the like. The dose of the active energy rays in this step is usually 10 to 10000 $mJ/cm^2$. The dose of the active energy rays is preferably 20 to 1000 $mJ/cm^2$ for the purpose of completely curing the coat and from the viewpoint of suppressing the yellowing of the coat.

In addition, it is preferred that before active energy ray irradiation is performed in the above step (4) after the above step (3), preliminary drying is performed at usually 23 to 150° C., preferably 50 to 120° C., because the coat including the above paint B is easy to reach a set-to-touch state.

According to at least one embodiment, the thickness (after complete curing) of the coat including the above paint A formed in this manner is not particularly limited but is usually 0.001 to 100 μm.

According to at least one embodiment, the thickness (after complete curing) of the coat including the above paint B formed in this manner is not particularly limited but is usually 0.001 to 100 μm.

According to another embodiment, the method for producing a multilayer coated film is a method that can be applied when a paint including an active energy ray-curable resin reaches a set-to-touch state (nontacky state) only by preliminary drying and need not be irradiated with active energy rays to be preliminary cured.

According to at least one embodiment, the method for producing multilayer coated film includes the step of (5) forming a wet coat including a paint C including an active energy ray-curable resin including a photopolymerization initiator on a film substrate to obtain a first laminate.

According to at least one embodiment, the above paint C includes at least one photopolymerization initiator. Examples of the photopolymerization initiator include those described above in the description of the above paint A, and one or a mixture of two or more of them can be used.

As the active energy ray-curable resin used in the above paint C, for example, among those described above in the description of the above paint A, those having a high molecular weight are preferred because they are easy to reach a set-to-touch state only by preliminary drying. Commercial examples include a urethane acrylate oligomer "Art Resin UN-952" (trade name) from Negami Chemical Industrial Co., Ltd., and a polymeric acrylate "UNIDIC RC29-120" (trade name) from DIC CORPORATION.

Any other optional component(s), a solvent, and the like can be further contained in the above paint C within the limits not contrary to the objects of the embodiments of the invention. As the above optional component(s) and solvent, for example, those described above in the description of the above paint A can be used.

According to at least one embodiment, the above paint C is obtained by mixing and stirring these components.

According to at least one embodiment, the method for forming a wet coat including the above paint C on a film substrate in the above step (5) is not particularly limited, and known web coating methods can be used. For example, the methods described above in the description of the above step (1) can be used.

According to at least one embodiment, the above film substrate is not particularly limited, and any film can be used. Especially, transparent resin films having excellent transparency, smoothness, heat resistance, mechanical strength, rigidity, and surface hardness are preferably used. As such transparent resin films, for example, those described above in the description of the above step (1) can be used.

According to at least one embodiment, the thickness of the above film substrate is not particularly limited. Preferred thickness is similar to the one described above in the description of step (1).

In addition, the above film substrate may be one in which an anchor coat is provided on the surface on which the coat including the paint C is to be formed or both surfaces for the purpose of providing various functions, for example, protection from fouling on the film substrate; and enhancement of adhesive strength. The anchor coat is not particularly limited, and a commonly used coat such as a polyester coat, an acrylic coat, a polyurethane coat, an acrylic urethane coat, and a polyester urethane coat can be provided. The thickness of the anchor coat is usually about 0.001 to 20 μm.

According to another embodiment, the method for producing a multilayer coated film includes the step of (6) preliminarily drying the wet coat including the above paint C to form a preliminarily dried coat including the above paint C in a set-to-touch state.

According to at least one embodiment, the wet coat including the above paint C formed in the above step (5) is preliminary dried to reach a set-to-touch state or a nontacky state in the above step (6), and does not cause handling problems such as sticking to a web apparatus even if coming into direct contact with the web apparatus. Therefore, in the above next step (7), a wet coat including the above paint B can be formed on the above preliminarily dried coat.

According to at least one embodiment, the above preliminary drying can be performed using a known web drying method and apparatus. The drying temperature is not particularly limited but is usually 23 to 150° C., preferably 50 to 120° C.

According to at least one embodiment, the method for producing a multilayer coated film includes the step of (7) forming a wet coat including a paint B on the preliminarily dried coat including the above paint C to obtain a second laminate.

Due to the coat including the above paint B formed in the above step (7), the coat including the above paint C does not come into direct contact with the air. Therefore, in the above next step (8), the coat including the above paint C can be easily completely cured without oxygen inhibition.

According to at least one embodiment, the above paint B is as described above regarding step (3) in the first embodiment.

According to at least one embodiment, the method for producing a multilayer coated film includes the step of (8) irradiating the second laminate with active energy rays having the reaction wavelength of the above photopolymerization initiator to cure the preliminarily dried coat including the above paint C.

According to at least one embodiment, the above step (8) is the step of completely curing the preliminarily dried coat including the above paint C, and active energy rays having the reaction wavelength of the above photopolymerization initiator are used. From the viewpoint of complete curing, the active energy rays should have the reaction wavelength of the photopolymerization initiator, and irradiation may be performed with white active energy rays from a high pressure mercury lamp, a metal halide lamp, or the like as a light source as they are. However, active energy rays having a wavelength not contributing to the reaction of the photopolymerization initiator only make the coat yellow, and therefore irradiation is performed preferably with white active energy rays that are made monochromatic using a filter or the like so as to have only a wavelength contributing to the reaction of the photopolymerization initiator.

The dose of the active energy rays in the above step (8) can be appropriately optimized by the curing properties of the above paint C, coat thickness, line speed, and the like. The dose of the active energy rays in this step is usually 10 to 10000 mJ/cm². Preferably, the dose of the active energy rays is 20 to 1000 mJ/cm² for the purpose of completely curing the coat and from the viewpoint of suppressing the yellowing of the coat.

According to at least one embodiment, the thickness (after complete curing) of the coat including the above paint C formed in this manner is not particularly limited but is usually 0.001 to 100 μm.

According to at least one embodiment, the thickness (after complete curing) of the coat including the above paint B formed in this manner is not particularly limited but is usually 0.001 to 100 μm.

EXAMPLES

Embodiments of the invention will be described below by Examples, but are not limited to these.

1. Formation and Physical Property Evaluation of Multilayer Coated Films

The formation of multilayer coated films and their physical property evaluation according to Examples according to various embodiments of the invention and Comparative Examples will be described below.

Physical Property Measurement Methods (i) Alkali Immersion Test

A rectangular sample (MD (machine direction) 100 mm×CD (cross direction) 30 mm) was cut from a multilayer coated film, ⅓ of the total length of the sample was immersed in a 4% by mass sodium hydroxide aqueous solution, and the sample was allowed to stand for 2 minutes. After the standing, the above sample was pulled up from the 4% by mass sodium hydroxide aqueous solution, washed well with pure water, and dried to provide a post-treatment sample. Using a spectral reflectance measuring apparatus "FILMETRICS F20" (trade name) from Filmetrics, Inc., the difference in the average value of three measurements of reflectance in the above wavelength region between the alkali immersion-treated portion and the non-immersed portion on the coated surface of the above post-treatment sample (i.e. the non-immersed portion average value minus the immersed portion average value) was obtained. When this difference was 0.5% or less, it was determined that all coats were completely cured (or, the curability was evaluated as being good).

(ii) Yellowness Index

The yellowness index (YI) of a multilayer coated film was measured according to JIS K7105: 1981 using a colorimeter "SolidSpec-3700" (trade name) produced by SHIMADZU CORPORATION.

Raw Materials Used

Paint A:

(A-1) 100 Parts by mass of the following (a1), 0.8 parts by mass of the following (d1), and 1420 parts by mass of 1-methoxy-2-propanol were mixed and stirred to obtain a paint.

(A'-1) 100 Parts by mass of the following (a1) and 1420 parts by mass of 1-methoxy-2-propanol were mixed and stirred to obtain a paint.

Paint B:

(B-1) 100 Parts by mass of the following (b1) and 110 parts by mass of 1-methoxy-2-propanol were mixed and stirred to obtain a paint.

Paint C:

(C-1) 100 Parts by mass of the following (c1), 2 parts by mass of the following (d1), and 1420 parts by mass of 1-methoxy-2-propanol were mixed and stirred to obtain a paint.

(a1) An ultraviolet curable resin "TYZ74-02-S" (trade name) from Toyochem Co., Ltd. containing an alkylphenone photopolymerization initiator (with a reaction wavelength of 240 nm) and zirconia (b1) A thermosetting, low refractive index layer-forming paint "AICAAITRON Z-824-1" (trade name) from Aica Kogyo Company, Limited (c1) A urethane acrylate oligomer "Art Resin UN-952" (trade name) from Negami Chemical Industrial Co., Ltd.

(d1) An α-aminoalkylphenone photopolymerization initiator "IRGACURE 907" (trade name) from BASF SE with a reaction wavelength of 310 nm Example 1

Step (1): Using a film Meyer bar coating apparatus, a wet coat composed of the above paint (A-1) was formed on one surface of a both-surface easy-adhesion-treated, biaxially stretched polyethylene terephthalate film "KFL12W-50" (trade name) from TEIJIN LIMITED having a thickness of 50 μm so that the coat thickness after complete curing was 0.03 μm (30 nm).

Step (2): The wet coat composed of the paint (A-1) obtained above was preliminarily dried at 80° C. and then subjected to 300 mJ/cm² irradiation using an ultraviolet irradiation apparatus from EYE GRAPHICS CO., LTD. including a high pressure mercury lamp as a light source in which a 254 filter was installed, and preliminarily cured. The coat composed of the paint (A-1) reached a set-to-touch state.

Step (3): Using a film Meyer bar coating apparatus, a wet coat composed of the above paint (B-1) was formed on the preliminarily cured coat composed of the paint (A-1) obtained above so that the coat thickness after complete curing was 0.04 μm.

Step (4): The laminate obtained in the above step (3) was preliminarily dried at 80° C. and then subjected to 300 mJ/cm$^2$ irradiation using an ultraviolet irradiation apparatus including a high pressure mercury lamp as a light source to completely cure the preliminarily cured coat composed of the paint (A-1). In addition, by this, the coat composed of the paint (B-1) reached a set-to-touch state.

This series of steps was continuously performed at a line speed of 15 m/min. For the multilayer coated film obtained in this manner, the tests of the above (i) and (ii) were performed. The results are shown in Table 1.

Comparative Example 1

Multilayer coated film formation and physical property evaluation were performed in the same manner as those in Example 1 except that the above paint (A'-1) was used instead of the above paint (A-1). The results are shown in Table 1.

Comparative Example 2

Multilayer coated film formation and physical property evaluation were performed in the same manner as those in Example 1 except that the above paint (A'-1) was used instead of the above paint (A-1), and the dose in step (2) was changed to 600 mJ/cm$^2$. The results are shown in Table 1.

Comparative Example 3

Multilayer coated film formation and physical property evaluation were performed in the same manner as those in Example 1 except that except that the above paint (A'-1) was used instead of the above paint (A-1), and the dose in step (2) was changed to 5000 mJ/cm$^2$. The results are shown in Table 1.

Comparative Example 4

Multilayer coated film formation and physical property evaluation were performed in the same manner as those in Example 1 except that the above paint (A'-1) was used instead of the above paint (A-1), and the dose in step (4) was changed to 5000 mJ/cm$^2$. The results are shown in Table 1.

Comparative Example 5

Coated film formation and physical property evaluation were performed in the same manner as those in Example 1 except that a coating layer composed of the paint (B-1) was not formed. The results are shown in Table 1.

Comparative Example 6

Coated film formation and physical property evaluation were performed in the same manner as those in Example 1 except that a coating layer composed of the paint (B-1) was not formed, and the dose in step (4) was changed to 5000 mJ/cm$^2$. The results are shown in Table 1.

Comparative Example 7

Multilayer coated film formation and physical property evaluation were performed in the same manner as those in Example 1 except that in step (2), white active energy rays (used in step (4) of Example 1) were used instead of active energy rays made monochromatic by the 254 filter, and their dose was changed to 5000 J/cm$^2$. The results are shown in Table 1.

Comparative Example 8

Multilayer coated film formation and physical property evaluation were performed in the same manner as those in Example 1 except that in step (4), active energy rays made monochromatic by the 254 filter used in step (2) of Example 1 were used instead of white active energy rays, and their dose was changed to 5000 J/cm$^2$. The results are shown in Table 1.

Example 2

Step (5): Using a film Meyer bar coating apparatus, a wet coat composed of the above paint (C-1) was formed on one surface of a both-surface easy-adhesion-treated, biaxially stretched polyethylene terephthalate film "KFL12W-50" (trade name) from TEIJIN LIMITED having a thickness of 50 μm so that the coat thickness after complete curing was 0.03 μm (30 nm).

Step (6): The wet coat composed of the paint (C-1) obtained above was preliminarily dried at 80° C. The coating composed of the paint (C-1) reached a set-to-touch state.

Step (7): Using a film Meyer bar coating apparatus, a wet coat composed of the above paint (B-1) was formed on the preliminarily dried coat composed of the paint (C-1) obtained above so that the coat thickness after complete curing was 0.04 μm.

Step (8): The laminate obtained in the above step (7) was preliminarily dried at 80° C. and then subjected to 300 mJ/cm$^2$ irradiation using an ultraviolet irradiation apparatus including a high pressure mercury lamp as a light source to completely cure the preliminarily dried coat composed of the paint (C-1). In addition, by this, the coat composed of the paint (B-1) reached a set-to-touch state.

This series of steps was continuously performed at a line speed of 15 m/min. For the multilayer coated film obtained in this manner, the tests of the above (i) and (ii) were performed. The results are shown in Table 2.

Comparative Example 9

Coated film formation and physical property evaluation were performed in the same manner as those in Example 2 except that a coating layer composed of the paint (B-1) was not formed. The results are shown in Table 2.

Comparative Example 10

Coated film formation and physical property evaluation were performed in the same manner as those in Example 2 except that a coating layer composed of the paint (B-1) was not formed, and the dose in step (8) was changed to 5000 mJ/cm$^2$. The results are shown in Table 2.

TABLE 1

|  | Example 1 | Comparative Example 1 | Comparative Example 2 | Comparative Example 3 | Comparative Example 4 | Comparative Example 5 | Comparative Example 6 | Comparative Example 7 | Comparative Example 8 |
|---|---|---|---|---|---|---|---|---|---|
| Paint A | A-1 | A'-1 | A'-1 | A'-1 | A'-1 | A-1 | A-1 | A-1 | A-1 |
| Paint B | B-1 | B-1 | B-1 | B-1 | B-1 | None | None | B-1 | B-1 |
| UV dose in step (2) mJ/cm$^2$ | 300 | 300 | 600 | 5000 | 300 | 300 | 300 | 5000*[1] | 300 |
| UV dose in step (4) mJ/cm$^2$ | 300 | 300 | 300 | 300 | 5000 | 300 | 5000 | 300 | 5000*[2] |
| Curability evaluation by alkali immersion test (%) | 0.24 | 1.72 | 1.23 | 1.1 | 1.68 | 1.21 | 0.77 | 1.0 | 1.3 |
| Yellowness index | 1.5 | 1.4 | 1.7 | 3.0 | 3.1 | 1.6 | 3.2 | 3.2 | 3.0 |

*[1]Irradiated with white active energy rays used in step (4) of Example 1.
*[2]Irradiated with active energy rays made monochromatic by the 254 filter used in step (2) of Example 1.

TABLE 2

|  | Example 2 | Comparative Example 9 | Comparative Example 10 |
|---|---|---|---|
| Paint C | C-1 | C-1 | C-1 |
| Paint B | B-1 | None | None |
| UV dose in step (8) mJ/cm$^2$ | 300 | 300 | 5000 |
| Curability evaluation by alkali immersion test (%) | 0.45 | 1.55 | 1.00 |
| Yellowness index | 2.0 | 2.0 | 3.3 |

A multilayer coated film including a thin coating having a thickness of 0.03 μm (30 nm) could be obtained by the producing method of the present invention with the yellowing of the coats suppressed, without decreasing the speed of the production line, and without using a material that was removed from a final product for disposal, such as a protective film, while the coats were completely cured.

On the other hand, in Comparative Example 1, the paint (A'-1) not containing the second photopolymerization initiator was used, and therefore the coats were not completely cured (the result of the alkali immersion test was poor). Therefore, in Comparative Example 2, the dose in step (2) was increased, but the coats were not completely cured yet. In Comparative Example 3, in order to completely cure the coats, the dose was increased to 5000 mJ/cm$^2$, and the coats yellowed significantly. In addition, in Comparative Example 4, even if the dose in step (4) was increased, the coats just yellowed, and the effect of complete curing was not obtained at all.

In Comparative Example 5, the coat composed of the paint (B-1) was not formed, and therefore the coat composed of the paint (A-1) was not completely cured. Therefore, in Comparative Example 6, in order to completely cure the coat, the dose in step (4) was increased to 5000 mJ/cm$^2$, and the coat yellowed significantly.

In Comparative Example 7, both the first and second photopolymerization initiators react in step (2). Therefore, in relation with the present invention, this Comparative Example is positioned as substantially the same illustration as Comparative Examples 1 to 4 in which one photopolymerization initiator was used.

In addition, in Comparative Example 8, the active energy rays used for irradiation in step (4) did not have the reaction wavelength of the unreacted polymerization initiator, and therefore in this step, practically no irradiation was performed. In other words, in this Comparative Example, irradiation is practically performed only before the coat of the paint B was formed. Therefore, in relation with the present invention, this Comparative Example is positioned as substantially the same illustration as Comparative Examples 5 and 6 in which the coat of the paint B was not formed.

Also in these Comparative Examples 7 and 8, the complete curing of the coats was not achieved, and the coatings yellowed.

In Comparative Example 9, the coat composed of the paint (B-1) was not formed, and therefore the coat composed of the paint (C-1) was not completely cured. Therefore, in Comparative Example 10, in order to completely cure the coat, the dose in step (8) was increased to 5000 mJ/cm$^2$, and the coat yellowed significantly.

2. Formation and Physical Property Evaluation of Multilayer Coated Films Using Poly(Meth)Acrylimide Resin Film as Film Substrate According to at least one embodiment, the formation of multilayer coated films using a poly(meth)acrylimide resin film as the film substrate and their physical property evaluation according to examples according to the embodiments of the invention will be described below.

Physical Property Measurement Methods (iii) Total Light Transmittance

The total light transmittance of a film substrate was measured according to JIS K7361-1: 1997 using a turbidimeter "NDH2000" (trade name) from Nippon Denshoku Industries Co., Ltd.

(iv) Haze

The haze of a film substrate was measured according to JIS K7136: 2000 using a turbidimeter "NDH2000" (trade name) from Nippon Denshoku Industries Co., Ltd.

(v) Yellowness Index

The yellowness index of a film substrate was measured according to JIS K7105: 1981 using a colorimeter "SolidSpec-3700" (trade name) from SHIMADZU CORPORATION.

(vi) Shrinkage-Starting Temperature (Dimensional Stability Against Heat)

A temperature-test piece length curve was determined in accordance with JIS K7197:1991, and the lowest temperature among temperatures at inflection points at which an increasing trend in the test piece length (expansion) shifted to a decreasing trend (shrinkage) (the temperature at which the test piece length reached to a local maximum) within the range of 20° C. to the glass transition temperature of a raw material resin was estimated as the shrinkage-starting temperature. The thermomechanical analyzer (TMA) "EXSTAR 6100 (trade name)" available from Seiko Instruments Inc. was used for the measurement. A test piece was prepared in a size of 20 mm length and 10 mm width so that the machine direction (MD) of the film corresponded to the longitudinal direction of the test piece. Conditioning of the test piece was performed at a temperature of 23° C.±2° C. and a relative humidity of 50±5% for 24 hours, and conditioning at the maximum temperature to be measured was not performed in order to evaluate dimensional stability as the physical property value of a film. The distance between chucks was set to 10 mm. The temperature program was one in which the temperature was retained at a temperature of 20° C. for 3 minutes and thereafter increased to a temperature of 300° C. at a temperature increase rate of 5° C./min.

(vii) Conductive Film Formation Test

A film substrate was placed in a sputtering apparatus. The pressure was reduced so that the degree of vacuum of the sputtering apparatus reached $5 \times 10^{-6}$ or less, and moisture and gas components in the film substrate and the sputtering apparatus were removed at 60° C. for 120 minutes. Then, a transparent conductive thin film (with a thickness of 15 nm) composed of an indium-tin complex oxide was formed on the transparent conductive film-formation surface (i.e. the printing surface) of the film substrate by using a direct current magnetron sputtering process. The target was indium oxide containing 10% by mass of tin oxide, the applied direct current power was 1.0 KW, the center roll temperature was 23° C., and the argon gas partial pressure during sputtering was 0.67 Pa. In addition, a slight amount of oxygen gas was flown so that the surface resistivity was minimum, and its partial pressure was $7.5 \times 10^{-3}$ Pa. The film substrate on which the transparent conductive film was formed was removed from the sputtering apparatus and subjected to an annealing treatment for 60 minutes. At this time, the annealing temperature was optimized so that a lower surface resistivity was obtained within the limits in which good appearance was maintained. The transparent conductive film formation properties were evaluated according to the following criteria:

A: A transparent conductive film having a surface resistivity of 100 Ω/sq or less was able to be formed.

B: A transparent conductive film having a surface resistivity of 120 Ω/sq or less was able to be formed, but a transparent conductive film having a surface resistivity of 100 Ω/sq or less could not be formed.

C: A transparent conductive film having a surface resistivity of 140 Ω/sq or less was able to be formed, but a transparent conductive film having a surface resistivity of 120 Ω/sq or less could not be formed.

D: A transparent conductive film having a surface resistivity of 150 Ω/sq or less was able to be formed, but a transparent conductive film having a surface resistivity of 140 Ω/sq or less could not be formed.

E: Even a transparent conductive film having a surface resistivity of 150 Ω/sq or less could not be formed.

(viii) Pencil Hardness

The pencil hardness of a film substrate was measured according to JIS K5600-5-4 under the condition of a load of 750 g using a pencil "uni" (trade name) from Mitsubishi Pencil Co., Ltd.

Raw Materials Used (α) A poly(meth)acrylimide Resin:

(α-1) A poly(meth)acrylimide "PLEXIMID T1770" (trade name) (having a glass transition temperature of 175.3° C.) from Evonik Industries AG (β) An aromatic polycarbonate resin:

(β-1) An aromatic polycarbonate "CALIBRE 302-4" (trade name) (having a glass transition temperature of 150.8° C.) from Sumika Styron Polycarbonate Limited Example 3

Using the poly(meth)acrylimide resin of the above (a-1) and an apparatus including a 50 mm extruder (equipped with a double flight screw of L/D=29 and CR=1.86), a T die having a die width of 680 mm, a mirror-finished roll, and a mirror-finished belt, a film having a thickness of 250 μm was formed under the conditions of temperature settings from the extruder to the T die of C1/C2/C3/AD/D1 to D6=280/300/320/320/320 to 320° C., a T-die lip opening of 0.5 mm, a screw rotation speed of 90 rpm, a mirror-finished roll surface temperature of 140° C., a mirror-finished belt surface temperature of 120° C., a mirror-finished belt pressing force of 1.4 MPa, and a take-up speed of 5.6 m/min. A film having good surface appearance was obtained. The film obtained above was passed through a heating furnace set at a temperature of 170° C. at a line speed set so that 5 minutes was required for the film to pass from the inlet to the outlet. For the obtained film, the above tests (iii) to (viii) were performed.

(1) Then, one surface of the film obtained above was subjected to a corona discharge treatment, and using a film Meyer bar coating apparatus, a wet coat composed of the above paint (A-1) was formed thereon so that the coat thickness after complete curing was 0.03 μm (30 nm).

(2) The wet coat composed of the paint (A-1) obtained above was preliminarily dried at 80° C. and then subjected to 300 mJ/cm² irradiation using an ultraviolet irradiation apparatus from EYE GRAPHICS CO., LTD. including a high pressure mercury lamp as a light source in which a 254 filter was installed, and preliminarily cured. The coat composed of the paint (A-1) reached a set-to-touch state.

(3) Using a film Meyer bar coat apparatus, a wet coat composed of the above paint (B-1) was formed on the preliminarily cured coat composed of the paint (A-1) obtained above so that the coat thickness after complete curing was 0.04 μm.

(4) The laminate obtained in the above step (3) was preliminarily dried at 80° C. and then subjected to 300 mJ/cm² irradiation using an ultraviolet irradiation apparatus including a high pressure mercury lamp as a light source to completely cure the preliminarily cured coat composed of the paint (A-1). In addition, by this, the coat composed of the paint (B-1) reached a set-to-touch state.

This series of steps was continuously performed at a line speed of 15 m/min. For the multilayer coated film obtained in this manner, the tests of the above (i) and (ii) were performed. The results are shown in Table 3.

Examples 4 to 16

Multilayer coated film formation and physical property evaluation were performed in the same manner as those in Example 3 except that the film substrate producing conditions were changed as shown in one of Tables 3 to 5. The results are shown in Tables 3 to 5.

Example 17

Multilayer coated film formation and physical property evaluation were performed as in Example 3 in all respects except that the annealing treatment using the heating furnace was not performed. The results are shown in Table 5.

Example 18

A molten film of a transparent multilayer film in which using the above (α-1) as both outer layers of the molten film of the transparent multilayer film and the above (β-1) as the intermediate layer of the molten film of the transparent multilayer film, an α1 layer; a β layer; and an α2 layer were directly laminated in this order was continuously extruded from a two-type three-layer multi-manifold coextrusion T die, supplied and charged between a rotating mirror-finished roll and a mirror-finished belt circulating along the outer peripheral surface of the mirror-finished roll so that the α1 layer was on the mirror-finished roll side, and pressed to obtain a transparent multilayer film having a total thickness of 250 μm, an α1 layer thickness of 80 μm, a β layer thickness of 90 μm, and an α2 layer thickness of 80 μm and having a good surface appearance. For the set conditions at this time, the drying temperature before film formation was 150° C. for (α-1) and 100° C. for (β-1); the set temperatures of the extruder that extruded (α-1) were C1/C2/C3/C4/C5/AD=260/290 to 290° C.; the set temperatures of the extruder that extruded (β-1) were C1/C2/C3/C4/C5/C6/AD=260/280/280/260 to 260/270° C.; both extruders were subjected to a nitrogen purge and used vacuum vents; the set temperature of the T die was 300° C., and the lip opening was 0.5 mm; the set temperature of the mirror-finished roll was 130° C.; the set temperature of the mirror-finished belt was 120° C., and the pressing force was 1.4 MPa; and the take-up speed was 6.5 m/min. The film obtained above was passed through a heating furnace set at a temperature of 170° C. at a line speed set so that 5 minutes was required for the film to pass from the inlet to the outlet. For the obtained film, the above tests (iii) to (viii) were performed.

(1) Then, one surface of the film obtained above was subjected to a corona discharge treatment, and using a film Meyer bar coating apparatus, a wet coat composed of the above paint (A-1) was formed thereon so that the coat thickness after complete curing was 0.03 μm (30 nm).

(2) The wet coat composed of the paint (A-1) obtained above was preliminarily dried at 80° C. and then subjected to 300 mJ/cm² irradiation using an ultraviolet irradiation apparatus from EYE GRAPHICS CO., LTD. including a high pressure mercury lamp as a light source in which a 254 filter was installed, and preliminarily cured. The coat composed of the paint (A-1) reached a set-to-touch state.

(3) Using a film Meyer bar coating apparatus, a wet coat composed of the above paint (B-1) was formed on the preliminarily cured coat composed of the paint (A-1) obtained above so that the coat thickness after complete curing was 0.04 μm.

(4) The laminate obtained in the above step (3) was preliminarily dried at 80° C. and then subjected to 300 mJ/cm² irradiation using an ultraviolet irradiation apparatus including a high pressure mercury lamp as a light source to completely cure the preliminarily cured coat composed of the paint (A-1). In addition, by this, the coat composed of the paint (B-1) reached a set-to-touch state.

This series of steps was continuously performed at a line speed of 15 m/min. For the multilayer coated film obtained in this manner, the tests of the above (i) and (ii) were performed. The results are shown in Table 5.

Example 19

Multilayer coated film formation and physical property evaluation were performed in the same manner as those in Example 18 except that the film substrate producing conditions were changed as shown in Table 5. The results are shown in Table 5.

Example 20

Multilayer coated film formation and physical property evaluation were performed in the same manner as those in Example 18 except that the annealing treatment using the heating furnace was not performed. The results are shown in Table 5.

TABLE 3

|  |  | Example 3 | Example 4 | Example 5 | Example 6 | Example 7 | Example 8 |
|---|---|---|---|---|---|---|---|
| Substrate film formation conditions | First mirror-finished body temperature ° C. | 140 | 140 | 140 | 140 | 140 | 140 |
|  | Second mirror-finished body temperature ° C. | 120 | 120 | 120 | 120 | 120 | 120 |
|  | Film thickness μm | 250 | 250 | 250 | 250 | 250 | 250 |
|  | Heating furnace temperature ° C. | 170 | 175 | 180 | 165 | 160 | 170 |
|  | Heating furnace passing time min | 5 | 5 | 5 | 5 | 5 | 3 |
| Film substrate | Total light transmittance % | 93 | 93 | 93 | 93 | 93 | 93 |
|  | Haze % | 0.4 | 0.4 | 0.4 | 0.4 | 0.4 | 0.4 |
|  | Yellowness index | 0.5 | 0.5 | 0.5 | 0.5 | 0.5 | 0.5 |
|  | Shrinkage-starting temperature ° C. | 175 | 175 | 175 | 170 | 165 | 170 |
|  | Conductive film formation test | A | A | A | B | B | B |
|  | Pencil hardness | F | F | F | F | F | F |
| Multilayer coated film | Paint A | A-1 | A-1 | A-1 | A-1 | A-1 | A-1 |
|  | Paint B | B-1 | B-1 | B-1 | B-1 | B-1 | B-1 |
|  | UV dose in step (2) mJ/cm² | 300 | 300 | 300 | 300 | 300 | 300 |
|  | UV dose in step (4) mJ/cm² | 300 | 300 | 300 | 300 | 300 | 300 |
|  | Curability evaluation by alkali immersion test (%) | 0.25 | 0.24 | 0.22 | 0.26 | 0.24 | 0.25 |
|  | Yellowness index | 1.6 | 1.6 | 1.6 | 1.6 | 1.6 | 1.6 |

TABLE 4

|  |  | Example 9 | Example 10 | Example 11 | Example 12 | Example 13 | Example 14 |
|---|---|---|---|---|---|---|---|
| Substrate film formation conditions | First mirror-finished body temperature ° C. | 140 | 140 | 160 | 110 | 75 | 140 |
|  | Second mirror-finished body temperature ° C. | 75 | 40 | 140 | 75 | 40 | 5 |
|  | Film thickness μm | 250 | 250 | 250 | 250 | 250 | 250 |
|  | Heating furnace temperature ° C. | 170 | 170 | 170 | 170 | 170 | 170 |
|  | Heating furnace passing time min | 5 | 5 | 5 | 5 | 5 | 5 |

TABLE 4-continued

|  |  | Example 9 | Example 10 | Example 11 | Example 12 | Example 13 | Example 14 |
|---|---|---|---|---|---|---|---|
| Film substrate | Total light transmittance % | 93 | 93 | 93 | 92 | 88 | 90 |
|  | Haze % | 0.6 | 0.9 | 0.3 | 1.0 | 1.9 | 1.6 |
|  | Yellowness index | 0.5 | 0.5 | 0.5 | 0.5 | 0.5 | 0.5 |
|  | Shrinkage-starting temperature ° C. | 175 | 175 | 175 | 175 | 175 | 175 |
|  | Conductive film formation test | A | A | A | A | A | A |
|  | Pencil hardness | F | F | F | F | F | F |
| Multilayer coated film | Paint A | A-1 | A-1 | A-1 | A-1 | A-1 | A-1 |
|  | Paint B | B-1 | B-1 | B-1 | B-1 | B-1 | B-1 |
|  | UV dose in step (2) mJ/cm$^2$ | 300 | 300 | 300 | 300 | 300 | 300 |
|  | UV dose in step (4) mJ/cm$^2$ | 300 | 300 | 300 | 300 | 300 | 300 |
|  | Curability evaluation by alkali immersion test (%) | 0.24 | 0.26 | 0.23 | 0.25 | 0.24 | 0.23 |
|  | Yellowness index | 1.6 | 1.6 | 1.6 | 1.6 | 1.6 | 1.6 |

TABLE 5

|  |  | Example 15 | Example 16 | Example 17 | Example 18 | Example 19 | Example 20 |
|---|---|---|---|---|---|---|---|
| Substrate film formation conditions | First mirror-finished body temperature ° C. | 140 | 140 | 140 | 130 | 130 | 130 |
|  | Second mirror-finished body temperature ° C. | 120 | 120 | 120 | 120 | 120 | 120 |
|  | Film thickness μm | 250 | 250 | 250 | 250 | 250 | 250 |
|  | Heating furnace temperature ° C. | 120 | 120 | — | 170 | 120 | — |
|  | Heating furnace passing time min | 5 | 30 | — | 5 | 5 | — |
| Film substrate | Total light transmittance % | 93 | 93 | 93 | 93 | 93 | 93 |
|  | Haze % | 0.4 | 0.4 | 0.4 | 0.4 | 0.4 | 0.4 |
|  | Yellowness index | 0.5 | 0.5 | 0.5 | 0.6 | 0.6 | 0.6 |
|  | Shrinkage-starting temperature ° C. | 161 | 161 | 161 | 170 | 159 | 159 |
|  | Conductive film formation test | C | C | C | B | C | C |
|  | Pencil hardness | F | F | F | B | B | B |
| Multilayer coated film | Paint A | A-1 | A-1 | A-1 | A-1 | A-1 | A-1 |
|  | Paint B | B-1 | B-1 | B-1 | B-1 | B-1 | B-1 |
|  | UV dose in step (2) mJ/cm$^2$ | 300 | 300 | 300 | 300 | 300 | 300 |
|  | UV dose in step (4) mJ/cm$^2$ | 300 | 300 | 300 | 300 | 300 | 300 |
|  | Curability evaluation by alkali immersion test (%) | 0.26 | 0.26 | 0.24 | 0.25 | 0.25 | 0.24 |
|  | Yellowness index | 1.6 | 1.6 | 1.6 | 1.7 | 1.7 | 1.7 |

By using a poly(meth)acrylimide resin film as a film substrate, a multilayer coated film that can be preferably used in One Plastic Solution was obtained.

Embodiments of the invention provide non-obvious advantages over the conventional art. For example, embodiments of the invention provide a multilayer coated film produced by the producing method according to various embodiments of the invention, has a coating, particularly a thin coating, including a paint including an active energy ray-curable resin, in which the coating is completely cured and yellowing is also suppressed. In addition, the producing method of the present invention is advantageous in terms of cost because the speed of a production line is not decreased, and a material that is removed from a final product for disposal, such as a protective film, is not used.

The multilayer coated film obtained by the producing method according to various embodiments of the invention has coatings with suppressed yellowing and therefore can be widely used in various fields such as optical functional films and decorative films. In addition, the multilayer coated film using a poly(meth)acrylimide resin film as the film substrate according to at least one embodiment of the invention can be suitably used in One Plastic Solution.

Terms used herein are provided to explain embodiments, not limiting the invention. Throughout this specification, the singular form includes the plural form unless the context clearly indicates otherwise. When terms "comprises" and/or "comprising" used herein do not preclude existence and addition of another component, step, operation and/or device, in addition to the above-mentioned component, step, operation and/or device.

Embodiments of the invention may suitably comprise, consist or consist essentially of the elements disclosed and may be practiced in the absence of an element not disclosed. According to at least one embodiment, it can be recognized by those skilled in the art that certain steps can be combined into a single step.

The terms and words used in the specification and claims should not be interpreted as being limited to typical meanings or dictionary definitions, but should be interpreted as having meanings and concepts relevant to the technical scope of the invention based on the rule according to which an inventor can appropriately define the concept of the term to describe the best method he or she knows for carrying out the invention.

The singular forms "a," "an," and "the" include plural referents, unless the context clearly dictates otherwise.

As used herein and in the appended claims, the words "comprise," "has," and "include" and all grammatical variations thereof are each intended to have an open, non-limiting meaning that does not exclude additional elements or steps.

Occurrences of the phrase "according to an embodiment" herein do not necessarily all refer to the same embodiment.

Therefore, the embodiments disclosed herein are not intended to limit the present invention but to describe the embodiments of the invention, and the embodiments will not limit the spirit and scope of the embodiments of the invention. The scope of the embodiments of the invention should be interpreted from the appended claims, and all techniques within the range of equivalency should be interpreted as being included in the scope of the embodiments of the invention.

REFERENCE SIGNS LIST

1: T die
2: Molten film
3: Mirror-finished roll
4: Mirror-finished belt
5: A pair of belt rollers

The invention claimed is:

1. A method for producing a multilayer coated film, comprising the steps of:
   forming a wet coat comprising a paint A comprising an active energy ray-curable resin comprising a first photopolymerization initiator and a second photopolymerization initiator having different reaction wavelengths from each other on a film substrate to obtain a first laminate;
   irradiating the first laminate with active energy rays having the reaction wavelength of the first photopolymerization initiator and not having the reaction wavelength of the second photopolymerization initiator to preliminarily cure the wet coat comprising the paint A to form a preliminarily cured coat comprising the paint A in a set-to-touch state;
   forming a wet coat comprising a paint B on the preliminarily cured coat comprising the paint A to obtain a second laminate; and
   irradiating the second laminate with active energy rays having the reaction wavelength of the second photopolymerization initiator to completely cure the preliminarily cured coat comprising the paint A,
   wherein, in advance of the irradiation to the second laminate, the active energy rays used for irradiating the second laminate are made monochromatic by a filter, by which the active energy rays made monochromatic have only a wavelength contributing to the reaction of the second photopolymerization initiator present in the preliminarily cured coat comprising the paint A.

2. The method according to claim 1, wherein the reaction wavelength of the first photopolymerization initiator and the reaction wavelength of the second photopolymerization initiator are 20 nm or more apart.

3. The method according to claim 1, wherein the film substrate is a poly(meth)acrylimide resin film produced by a method comprising the step of:
   annealing a poly(meth)acrylimide resin film at a temperature equal to or more than a temperature 20° C. lower than a glass transition temperature of the poly(meth)acrylimide resin and equal to or less than a temperature 10° C. higher than the glass transition temperature for 3 minutes or more.

4. The method according to claim 3, wherein the poly(meth)acrylimide resin film is produced by a method further comprising the steps of:
   (A) continuously extruding a molten film of the poly(meth)acrylimide resin from a T die using an apparatus comprising an extruder and the T die;
   (B) feeding and pressing the above molten film of the poly(meth)acrylimide resin between a first rotating or circulating mirror-finished body and a second rotating or circulating minor-finished body; and
   (C) delivering the film to a following transfer roll while making the film to be held on the first rotating or circulating minor-finished body,
   wherein (D) the surface temperature of the first mirror-finished body is higher than the surface temperature of the second mirror-finished body.

5. The method according to claim 3, wherein the poly(meth)acrylimide resin film is produced by a method further comprising the steps of:
   (A') continuously coextruding, with a coextrusion apparatus equipped with an extruder and a T die, a molten film of a transparent multilayer film from the T die, wherein the transparent multilayer film has a first poly(meth)acrylimide resin layer ($\alpha1$), an aromatic polycarbonate resin layer ($\beta$), and a second poly(meth)acrylimide resin layer ($\alpha2$), the layers being laminated directly in this order;
   (B') feeding and pressing the molten film of the transparent multilayer film between a first rotating or circulating mirror-finished body and a second rotating or circulating mirror-finished body; and
   (C') delivering the film to a following transfer roll while making the film to be held on the first rotating or circulating mirror-finished body,
   wherein (D') the surface temperature of the first mirror-finished body is higher than the surface temperature of the second mirror-finished body.

6. A method according to claim 1, wherein, in the irradiation step to the second laminate, the only photopolymerization initiator present in the second laminate is the first and second photopolymerization initiators present in the preliminarily cured coat comprising the paint A.

* * * * *